Sept. 21, 1948.  E. NASSIMBENE  2,449,950
CONNECTOR FOR BELTS
Filed Feb. 13, 1945

*INVENTOR.*
ERNEST NASSIMBENE
BY Martin E. Anderson
*ATTORNEY.*

Patented Sept. 21, 1948

2,449,950

UNITED STATES PATENT OFFICE 2,449,950

CONNECTOR FOR BELTS

Ernest Nassimbene, Denver, Colo., assignor to Gates Rubber Company, Denver, Colo., a corporation of Colorado Application February 13, 1945, Serial No. 577,706

1 Claim. (Cl. 24—31)

This invention relates to improvements in connectors for belts.

In the transmission of power, various types of belts are employed, among the most popular of which is the V-type belt. Where the machines are so constructed that an endless belt can be applied and removed, such belts are usually employed. In many machines the parts are so related that an endless belt cannot be used and it is therefore necessary to splice the belt or connect the ends by some suitable connecting means.

It is the object of this invention to produce a simple and substantial connecting device for belts of the type having a transverse layer of tension elements, such as wires or cotton cords and which shall be of such construction and design that the ends of the belt can be secured to each other or disconnected quite readily.

Another object of the invention is to produce a belt connector of such design that it will have a long life and which, in addition, will be of simple construction so that it may be manufactured and sold at a comparatively low price.

The above and any other objects that may become apparent as this description proceeds, are attained by means of a construction and arrangement of parts that will now be described in detail, and for this purpose reference will be had to the accompanying drawing in which the invention has been illustrated, and in which.

Figure 1:
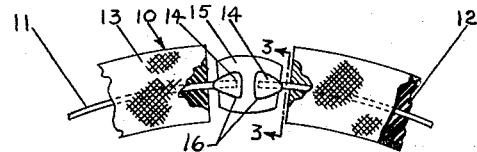
Figure 1 is a side elevation of a portion of a V-type belt showing the ends joined by means of the improved connector.

In the drawing, reference numeral 10 designates a belt of the V-type which consists of a transverse layer of cords or wires 11, which form the tension element. These are positioned in a body 12 of rubber composition or of rubber impregnated fabric, of various specific constructions. In the embodiment shown, the belt is covered on its outer surface by a bias cut rubberized fabric 13. The tension elements 11 project beyond the ends of the belt and have secured to them anchoring lugs 14. In the embodiment illustrated in Figure 1, the anchoring lugs are wedge shape and taper inwardly towards the ends of the belt. Lugs 14 are connected or joined by means of a link 15, which is made of some suitable material, such as metal, either steel, copper, brass or bronze or of some suitable plastic. Link 15 is preferably shaped somewhat as shown in Figure 1 and extends substantially the entire width of the belt. The side elevation of the link, when viewed through plane 3—3 in Figure 1, is substantially like that shown in Figure 3, from which it will be seen that the dimensions are slightly less than the dimensions of the belt. The anchoring lugs 14 are inserted into the grooves 16 of link 15 by a sliding motion. With the shape of the grooves and lugs shown in Figure 3, it is evident that the lugs cannot rock or turn in the grooves and therefore the slight bending that takes place as the belt is flexed about the pulleys is taken care of entirely by the flexure of the tension elements. The distance from the ends of the link 15 and the opposed ends of the belt can be greater than that indicated in Figure 1, if found to be necessary or desirable. Belts of the V-type are usually not very wide and cooperate with pulleys having correspondingly shaped grooves, and, as a result of this, the link 15 cannot be displaced by transverse movement because even if some such movement does take place, the link is prevented from moving outwardly beyond the inclined sides of the belt by the action of the sides of the grooved pulley. It is sometimes desirable, however, to secure one of the lugs 14 in the grooves in such a manner that it cannot slide longitudinally and when this is done, the ends of the belt must be offset transversely in making and releasing the connection. If both of the lugs are slidable in the link, it is evident that the link can be positioned in any belt, regardless of the width of the layer, without offsetting of the ends of the belt.

Figure 2:
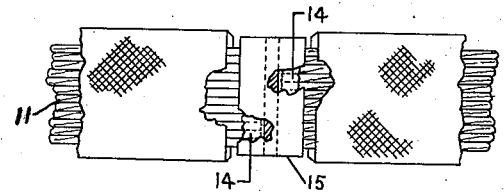
Figure 2 is a top plan view of the belt shown in Figure 1, with portions thereof broken away to better disclose the construction.
Figure 3:
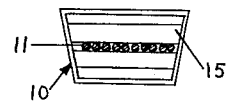
Figure 3 is a section taken on line 3—3, Figure 1.

In the embodiment shown in Figures 1, 2 and 3 the grooves in the link are shown as wedge shape; however, the exact shape is not of any particular importance so long as there are overlapping wall surfaces that prevent the lugs from being displaced longitudinally of the belt by the belt tension. It is important, however, that the lug shall not be rockable or slightly rotatable in the grooves. It is to be understood, however, that sufficient clearance to allow the lugs to be readily inserted and removed is not objectionable.

Figure 4:
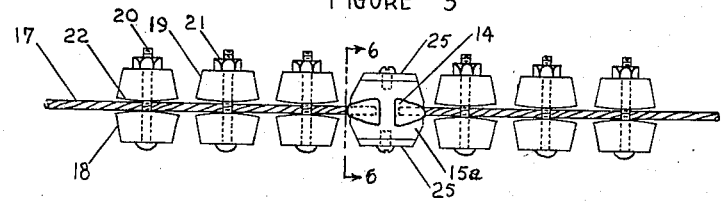
Figure 4 is a side elevation of a modification for use with belts of the type employed in "Reeves speed changing machines" showing the ends joined by the improved connector that forms the subject of this application.
Figures 5, 6:
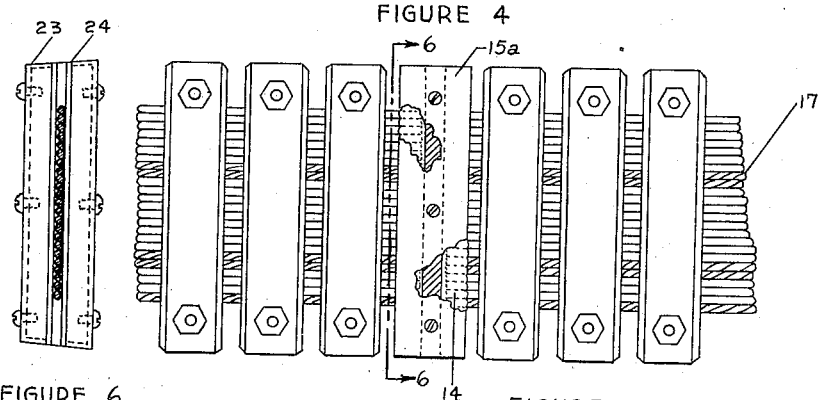
Figure 5 is a top plan view of a portion of the belt shown in Figure 4, parts of the connector link being broken away so as to better disclose the construction.
Figure 6 is a section taken on lines 6—6, Figures 4 and 5.

In Figures 4, 5 and 6, the connector has been shown as applied to a wide belt of the type used in what is termed the "Reeves speed changing machine." Such belts are quite wide and in the embodiment illustrated, they consist of a transverse layer 17 of flexible wires which are clamped between wooden blocks 18 and 19 by means of bolts 20 and nuts 21. These blocks have their inner surfaces somewhat curved as indicated at 22. The heads of the bolts may be countersunk or may project slightly as shown in Figure 4, because the top and bottom of the belt does not engage any surface, the driving surfaces being the inclined surfaces designated by reference numeral 23. The ends of the wooden blocks 19 are sometimes covered with leather 24, so as to obtain a better friction surface and a more nearly noiseless operation. Lugs 14 are secured to the ends of the tension wires 17 in the same manner as employed in obtaining a connection between the ends of the tension elements 11 and the lugs 14 in Figure 1. Since the tension elements are usually formed from stranded wire cable, the ends are spread apart slightly and the lugs 14 molded about the ends in a manner quite common in connection with the anchoring of flexible steel cables. In the embodiment shown in Figures 4 to 6, the link has been designated by reference numeral 15a and differs slightly from the one shown in Figures 1 to 3, the principal difference being that it is so constructed that it may have a covering 25 of leather both at the top and the bottom and the ends may also be covered with leather so as to assure noiseless operation.

Where such belts, as are shown in Figures 4 and 5, are not very wide in proportion to their length, only one of the lugs 14 needs to be slidable in the corresponding groove of the link. Where the belts are very wide in proportion to their length, the two lugs must be slidable in the link or else a slightly modified form of construction must be employed because with a wide short belt, the great amount of offset required to effect a connection or a disconnection with only a single lug slidable connection with the link is excessive.

Figure 7:
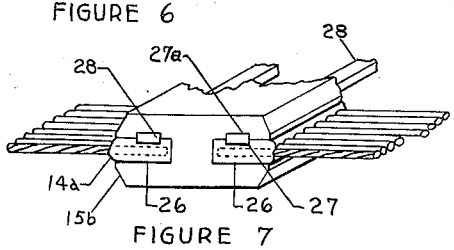
Figure 7 is a fragmentary oblique view showing a slightly modified form of connector element.

In very wide belts of the type used in speed changing machines, the link can be constructed as shown in Figure 7, in which it has been designated by reference numeral 15b. The grooves 26 have been shown as provided with parallel top and bottom sides and the lugs 14a are of a corresponding shape. In order to anchor the lugs in a link of the type shown in Figure 7, the upper surface of each lug is provided with a key way groove 27 and the upper wall of key way grooves 26 have a corresponding groove 27a. After the lugs 14a have been inserted in the grooves 26, rectangular bars or keys 28 are positioned in the cooperating key way grooves 27 and 27a, thereby anchoring the lugs from movement in the direction of the tension members. When the belt is to be disconnected the bars or keys 28 are driven out by means of a suitable punch.

Particular attention is called to the fact that the grooves for the reception of the anchoring lugs are of such shape that the lugs cannot rock in the grooves. The grooves and lugs may have either a wedge shape cross section like that shown in Figures 1 and 4, or may be of the shape shown in Figure 7. When a non-circular cross section is used, the shape must be such as to provide overlapping wall surfaces that resist the tension and the shape must be such as to prevent rotation. In the embodiment shown in Figure 7, the overlapping wall surfaces are provided by the bars 28 and the side walls of grooves 27 and 27a.

In the embodiment shown in Figure 5, two securing bolts have been designated for each pair of wooden blocks, but more bolts can be provided, if necessary.

Having described the invention what is claimed as new is:

A connection for power transmission belts having a transverse layer of tension-resisting elements, comprising, a link positioned between the ends of the belt, at least one of the ends of the link facing the ends of the belt, having a transverse angular groove having opposed sides, one side of which has a key way groove extending the length thereof, a groove engaging anchoring lug attached to one end of the tension layer, said lug having substantially the same cross sectional size and shape as the groove, the side of the lug facing the side of the angular groove having the key way groove, having a corresponding key way groove. and a key positioned in the opposed key way grooves for resisting tensional forces tending to separate the lug from the link.

ERNEST NASSIMBENE.

REFERENCES CITED

The following references are of record in the file of this patent:

UNITED STATES PATENTS

| Number | Name | Date |
| --- | --- | --- |
| 1,706,354 | Geist | Mar. 19, 1929 |
| 2,265,604 | Knoedler | Dec. 9, 1941 |